(12) United States Patent
Lin et al.

(10) Patent No.: US 12,199,462 B2
(45) Date of Patent: Jan. 14, 2025

(54) MULTIFUNCTIONAL INTERFACE CONVERSION DEVICE AND MULTIFUNCTIONAL INTERFACE CONVERSION SYSTEM

(71) Applicant: SHENZHEN HONOR ELECTRONIC CO., LTD, Guangdong (CN)

(72) Inventors: Liyan Lin, Guangdong (CN); Wei Wen, Guangdong (CN); Yuetian Wang, Guangdong (CN)

(73) Assignee: SHENZHEN HONOR ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/339,344

(22) Filed: Jun. 22, 2023

(65) Prior Publication Data

US 2023/0420967 A1    Dec. 28, 2023

(30) Foreign Application Priority Data

Jun. 24, 2022  (CN) .......................... 202221617655.X

(51) Int. Cl.
| G06F 1/26 | (2006.01) |
|---|---|
| H02J 7/00 | (2006.01) |
| G06F 1/16 | (2006.01) |

(52) U.S. Cl.
CPC ................ H02J 7/007 (2013.01); G06F 1/26 (2013.01); G06F 1/1632 (2013.01); H02J 2207/20 (2020.01)

(58) Field of Classification Search
None
See application file for complete search history.

(56) References Cited

U.S. PATENT DOCUMENTS

| 2002/0032875 A1* | 3/2002 | Kashani | G06F 1/1632 |
| | | | 719/310 |
| 2004/0148531 A1* | 7/2004 | Yamazaki | G06F 1/26 |
| | | | 713/300 |
| 2016/0141900 A1* | 5/2016 | Voller | H02J 7/342 |
| | | | 320/114 |
| 2018/0373289 A1* | 12/2018 | Sultenfuss | H02J 7/0029 |
| 2022/0187880 A1* | 6/2022 | Kim | G06F 1/1658 |

* cited by examiner

*Primary Examiner* — Daniel Cavallari
(74) *Attorney, Agent, or Firm* — Nathan & Associates; Menachem Nathan

(57) ABSTRACT

This disclosure provides a multifunctional interface conversion device and a multifunctional interface conversion system. The multifunctional interface conversion device includes a power adapter module and an interface conversion module. The power adapter module includes an AC-to-DC conversion unit, a first DC-to-DC conversion unit, and a power output terminal. The interface conversion module includes a first power management unit and a first interface. This disclosure combines the power adapter module and the interface conversion module to obtain the multifunctional interface conversion device. The AC-to-DC conversion unit and the first DC-to-DC conversion unit convert an input alternating current into a stable second direct current, and the second direct current is output to the interface conversion module through the power output terminal and the first power management unit, realizing supplying power to an external terminal or charging an external battery without a power adapter and improving relay capability of the external terminal.

18 Claims, 3 Drawing Sheets

MULTIFUNCTIONAL INTERFACE CONVERSION DEVICE AND MULTIFUNCTIONAL INTERFACE CONVERSION SYSTEM

CROSS-REFERENCE TO RELATED APPLICATIONS

This application claims priority of Chinese Patent Application No. 202221617655.X filed on Jun. 24, 2022, and titled "MULTIFUNCTIONAL INTERFACE CONVERSION DEVICE AND MULTIFUNCTIONAL INTERFACE CONVERSION SYSTEM", which is incorporated by reference in its entirety in the present application.

TECHNICAL FIELD

The present application relates to electronic technology, in particular to a multifunctional interface conversion device and a multifunctional interface conversion system.

BACKGROUND

With the rapid development of electronic products, to achieve thin and light usage experience of more and more electronic products, interfaces of different functions on the electronic products are compressed, which leads to a need for an additional interface expansion product to meet a user's different requirements when the user uses the electronic products. However, an interface conversion device in the prior art has a single function, which cannot achieve high-efficiency fast charging and multifunctional interface conversion at the same time.

SUMMARY

The present provides a multifunctional interface conversion device and a multifunctional interface conversion system, which can realize stable and high-efficiency fast charging and have a simultaneous conversion function of multiple interfaces.

According to an aspect, the present disclosure provides a multifunctional interface conversion device. The power adapter module includes: an alternating current-to-direct current conversion unit configured to convert an input alternating current into a first direct current; a first direct current-to-direct current conversion unit configured to convert the first direct current into a second direct current; and a power output terminal configured to output the second direct current. The interface conversion module includes: a first power management unit connected to the power output terminal and configured to output the second direct current to a first interface of the interface conversion module when the power output terminal outputs the second direct current, and to pull a third direct current from the first interface to supply power to the interface conversion module when the power output terminal stops outputting the second direct current.

In a possible implementation method of the present disclosure, the interface conversion module further has a plurality of second interfaces and a plurality of conversion paths configured to perform interface switching between the plurality of second interfaces and the first interface respectively. When the first power management unit outputs the second direct current to the first interface, the second direct current is provided to the plurality of conversion paths. After the first power management unit pulls the third direct current, the third direct current is provided to the plurality of conversion paths.

In a possible implementation method of the present disclosure, the interface conversion module further includes: a second direct current-to-direct current conversion unit electrically connected between the first power management unit and the plurality of conversion paths and configured to convert the second direct current or the third direct current provided by the first power management unit to the plurality of conversion paths into a fourth direct current.

In a possible implementation method of the present disclosure, the first direct current-to-direct current conversion unit includes: a power factor correction part electrically connected to the alternating current-to-direct current conversion unit and configured to eliminate a ripple current in the first direct current.

In a possible implementation method of the present disclosure, the first direct current-to-direct current conversion unit further includes: a transformer part electrically connected to the power factor correction part and configured to convert the first direct current into the second direct current.

In a possible implementation method of the present disclosure, the first direct current-to-direct current conversion unit further includes: an output filter part electrically connected to the transformer part and configured to filter the second direct current.

In a possible implementation method of the present disclosure, the first direct current-to-direct current conversion unit further includes: a second power management unit electrically connected to the first power management unit and configured to perform Handshake communication with the first power management unit and control the power output terminal to output the second direct current to the first power management unit.

In a possible implementation method of the present disclosure, the alternating current-to-direct current conversion unit includes: an input filter part configured to filter the input alternating current power.

In a possible implementation method of the present disclosure, the alternating current-to-direct current conversion unit further includes: a rectification part electrically connected to the input filter part and configured to perform rectification on the input alternating current to obtain the first direct current.

In another aspect, the present disclosure provides a multifunctional interface conversion system, which includes the multifunctional interface conversion device as described above.

The present disclosure combines the power adapter module and the interface conversion module to obtain the multifunctional interface conversion device. When an external terminal uses the multifunctional interface conversion device of the present disclosure to perform interface conversion, the input alternating current is converted into the stable second direct current through the alternating current-to-direct current conversion unit and the first direct current-to-direct current conversion unit. When the power output terminal outputs the second direct current, the first power management unit outputs the second direct current to the first interface of the interface conversion module, thereby supplying power to the external terminal connected to the first interface and making the power supply stable and efficient. Therefore, the device provided herein may supply power to an external terminal or charge an external battery without a power adapter, to improve relay capability of the external terminal when using the multifunctional interface conversion device. In addition, when the power output terminal stops outputting the second direct current, the first power management unit pulls the third direct current from the first interface to supply power to the interface conversion module, so as to ensure a normal operation of the interface conversion module and meet various interface functional requirements.

BRIEF DESCRIPTION OF THE DRAWINGS

In order to illustrate technical solutions in embodiments of the present disclosure more clearly, the drawings that need to be used in the description of the embodiments will be briefly introduced below. Obviously, the drawings in the following description are only some embodiments of the present disclosure. For those skilled in the art, other drawings can also be obtained based on these drawings without any creative effort.

DETAILED DESCRIPTION

Figure 1:
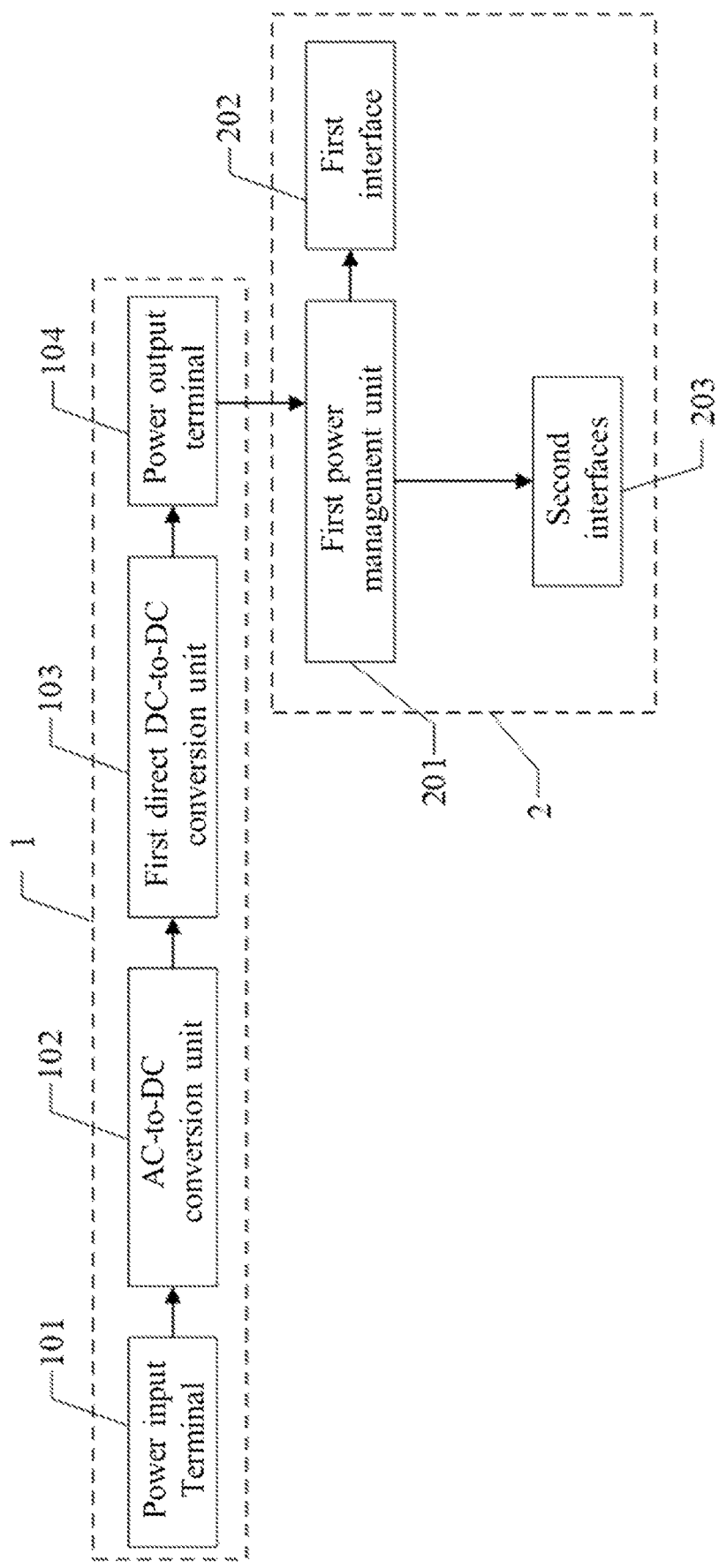
FIG. 1 is a schematic structural diagram of an embodiment of a multifunctional interface conversion device according to some embodiments of the present disclosure.

The technical solutions in the embodiments of the present disclosure will be described clearly and completely with reference to the drawings in the embodiments of the disclosure hereinafter. Apparently, the described embodiments are only some of the embodiments of the disclosure, not all of them. Based on the embodiments in the present disclosure, all other embodiments obtained by those skilled in the art without making creative efforts fall within the protection scope of the present disclosure.

In the description of the present disclosure, it should be understood that orientations or positional relationships indicated by the terms "center", "longitudinal", "transverse", "length", "width", "thickness", "upper", "lower", "front", "rear", "left", "right", "vertical", "horizontal", "top", "bottom", "inner", "outer", etc., are based on an orientation or positional relationship shown in the drawings, which are merely for the convenience of describing the present disclosure and simplifying the description, but does not indicate or imply that a device or an element referred to must have a specific orientation, or be constructed and operated in a specific orientation, and therefore should not be interpreted as a limitation of the present disclosure. In addition, the terms "first" and "second" are used for descriptive purposes only, and cannot be interpreted as indicating or implying relative importance or implicitly specifying a quantity of indicated technical features. Thus, a feature defined as "first" or "second" may explicitly or implicitly include one or more of such features. In the description of the present disclosure, "a plurality of" means two or more, unless otherwise specifically defined.

In the present disclosure, the word "exemplary" is used to mean "serving as an example, illustration, or explanation". Any embodiment described in the present disclosure as "exemplary" is not necessarily to be construed as preferred or advantageous over other embodiments. The following description is given to enable any person skilled in the art to make and use the present disclosure. In the following description, details are set forth for purposes of explanation. It should be understood that a person having ordinary skills in the art would recognize that the present disclosure may be practiced without these specific details. In other instances, well-known structures and processes are not described in detail to avoid unnecessary detail from obscuring the description of the present disclosure. Thus, the present disclosure is not intended to be limited to the embodiments shown, but is consistent with the widest scope in compliance with the principles and features disclosed in the present disclosure.

The embodiments of the present disclosure provide a multifunctional interface conversion device and a multifunctional interface conversion system, which will be described in detail below.

Figure 2:
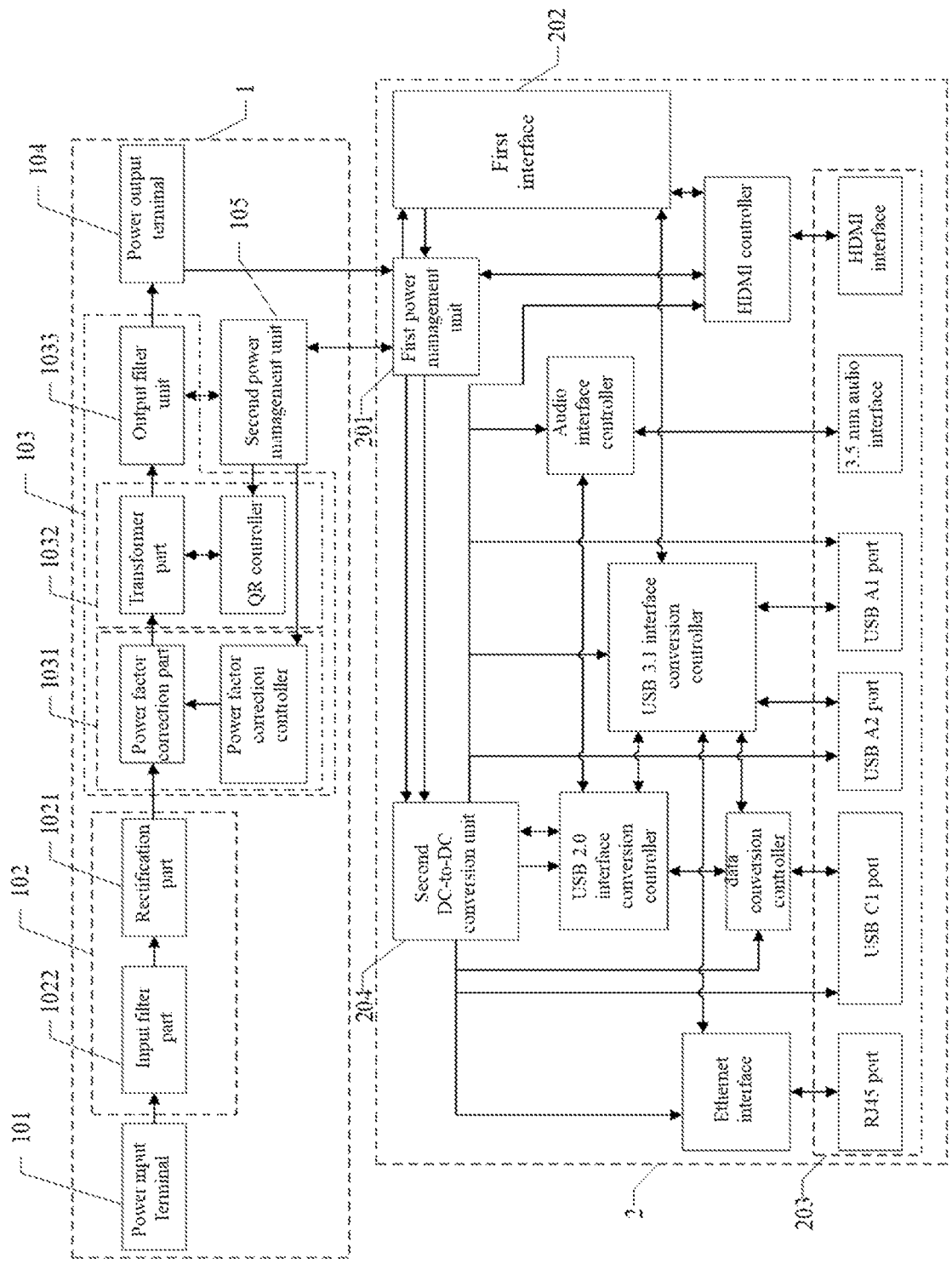
FIG. 2 is another schematic structural diagram of the embodiment of the multifunctional interface conversion device according to some embodiments of the present disclosure.

As shown in FIG. 1 and FIG. 2, FIG. 1 and FIG. 2 are schematic structural diagrams of an embodiment of the multifunctional interface conversion device according to some embodiments of the present disclosure. The multifunctional interface conversion device includes a power adapter module 1 and an interface conversion module 2.

The power adapter module 1 includes a power input terminal 101, an alternating current-to-direct current (AC-to-DC) conversion unit 102, a first direct current-to-direct current (DC-to-DC) conversion unit 103, and a power output terminal 104.

The power input terminal 101 is configured to input AC power. The power input terminal 101 is connected to an external power supply. The external power supply may be an Alternating Current (AC) power supply, an AC/direct current (DC) power supply, a DC/DC power supply, a regulated power supply, a communication power supply, a module power supply, a variable frequency power supply, an inverter power supply, an AC regulated power supply, etc., which is not limited in this embodiment. In this embodiment, an input range of the input AC current of the power input terminal 101 may be 90 VAC-264 VAC, or other ranges, which is not limited in this embodiment.

The AC-to-DC conversion unit 102 is configured to convert the input AC current into a first DC current.

The first DC-to-DC conversion unit 103 is configured to convert the first direct current into a second direct current.

The power output terminal 104 is configured to output the second direct current. In this embodiment, the power output terminal 104 may be a transmission line for transmitting the second direct current, or may be an output interface that can be externally connected to an external terminal. When being externally connected to the external terminal, the output interface may supply power to the external terminal. This embodiment does not specifically limit arrangement of the power output terminal 104.

In this embodiment, as an example, the second direct current output by the power output terminal 104 includes at least electric energy of any one of the following parameters: 5V3A, 9V3A, 12V3A, 15V3A, and 20V4A. Optionally, the second direct current output by the power output terminal 104 may also include other electric energy of other power, which is not specifically limited in this embodiment.

The interface conversion module 2 includes a first power management unit 201 and a first interface 202.

The first power management unit 201 is connected to the power output terminal 104, and is configured to output the second direct current to the first interface 202 of the interface conversion module 2 when the power output terminal 104 outputs the second direct current, and to pull a third direct current from the first interface 202 to supply power to the interface conversion module 2 when the power output terminal 104 stops outputting the second direct current.

In this embodiment, after performing Handshake communication with the power adapter module 1, the first power management unit 201 receives the second direct current output from the power adapter module 1. After performing Handshake communication with the external terminal externally connected to the first interface 202, the first power management unit 201 supply power to the first interface 202.

In this embodiment, the first power management unit 201 may be a power delivery (PD) management controller, or a fast-charging PD controller supporting a fast-charging source protocol.

Specifically, when the power adapter module 1 is configured as a fast-charging source adapter module and the first power management unit 201 is configured as a fast-charging PD controller, both the fast-charging source adapter module and the first power management unit 201 support the fast-charging source protocol. During an application process, when the power adapter module 1 outputs the second direct current, when communicating with the fast-charging source adapter module and after performing Handshake communication with the external terminal connected to the first interface 202, the first power management unit 201 may realize fast power supply or fast charging of the external terminal and make the power supply stable and efficient. This embodiment does not specifically limit the first power management unit 201.

In this embodiment, the first interface 202 may be a Universal Serial Bus (USB) Type C interface, and may also be other types of interfaces of USB. The first interface 202 supports the following protocols but is not limited to the following protocols: the PD2.0 charging protocol, the PD3.0 charging protocol, and the PD3.1 charging protocol. The maximum output power of the first interface 202 is 80 W (20V/4A). The first interface 202 supports but is not limited to the following functions: an image transmission function, a voice transmission function, and a data transmission function. In this embodiment, the first interface 202 can be configured according to specific requirements, and relevant parameters of the first interface 202 are not specifically limited in this embodiment.

In the present disclosure, the power adapter module 1 and the interface conversion module 2 are combined to obtain the multifunctional interface conversion device. When an external terminal uses the multifunctional interface conversion device of the present disclosure to perform interface conversion, the input alternating current is converted into the stable second direct current through the AC-to-DC conversion unit 102 and the first DC-to-DC conversion unit 103. When the power output terminal 104 outputs the second direct current, the first power management unit 201 outputs the second direct current to the first interface 202 of the interface conversion module 2, thereby supplying power to the external terminal connected to the first interface 202 and making the power supply stable and efficient. Therefore, the device provided herein may supply power to an external terminal or charge an external battery without a power adapter, so as to improve relay capability of the external terminal when using the multifunctional interface conversion device. In addition, when the power output terminal 104 stops outputting the second direct current, the first power management unit 201 pulls the third direct current from the first interface 202 to supply power to the interface conversion module 2, so as to ensure a normal operation of the interface conversion module 2 and meet various interface functional requirements.

In another embodiment of the present disclosure, the AC-to-DC conversion unit 102 includes: a rectification part 1021 electrically connected to the input filter part 1022 (see below) and configured to perform rectification on the input alternating current to obtain the first direct current.

Specifically, the rectification part 1021 includes a rectifier. The rectifier may be any one of a half-wave rectification circuit, a full-wave rectification circuit, and a bridge rectification circuit. The AC-to-DC conversion unit 102 may be other devices capable of converting the alternating current into the first direct current, which is not specifically limited in this embodiment.

In another embodiment of the present disclosure, the AC-to-DC conversion unit 102 further includes: an input filter part 1022, which is coupled between the power input terminal 101 and the rectification part 1021, and is configured to filter the input alternating current power.

Specifically, the input filter part 1022 may include but is not limited to the following filter circuits: an electromagnetic interference (EMI) filter, a capacitor filter, an inductance filter, and a composite filter such as an LC filter and an RC filter, which is not specifically limited in this embodiment.

In another embodiment of the present disclosure, the first DC-to-DC conversion unit 103 includes: a power factor correction part 1031 electrically connected to the rectification part 1021 and configured to eliminate a ripple current in the first direct current.

Specifically, the power factor correction part 1031 includes a Power Factor Correction (PFC) circuit electrically connected to the rectification part 1021 and a power factor correction controller electrically connected to the power factor correction circuit. During the application process, the power factor correction controller controls the power factor correction circuit to start, and the power factor correction circuit filters out the ripple current in the first direct current to reduce a total harmonic distortion, so as to compensate power factor of the first direct current and the second direct current transmitted in power adapter module 1, thereby improving output power of the first interface 202. In this embodiment, by setting the power factor correction circuit and the power factor correction controller in the first DC-to-DC conversion unit 103, the maximum output power of the first interface 202 can reach 80 W.

In this embodiment, the first DC-to-DC conversion unit 103 further includes: a transformer part 1032 electrically connected to the power factor correction unit 1031 and configured to convert the first direct current into the second direct current. Specifically, the transformer part 1032 includes a transformer electrically connected to the PFC circuit and a Quasi-Resanent (QR) flyback controller that communicates bidirectionally with the transformer (i.e., a QR controller in FIG. 2). The QR controller controls the transformer to convert the first direct current into the second direct current. In this embodiment, the transformer part 1032 may also be a voltage regulator, or any device or circuit structure capable of converting the first direct current into the second direct current, which is not specifically limited in this embodiment.

In this embodiment, the first DC-to-DC conversion unit 103 further includes: an output filter unit 1033 electrically connected to the transformer part 1032 and configured to filter the second direct current. In this embodiment, the output filter unit 1033 includes but is not limited to the following filter circuits: an electromagnetic interference (EMI) filter, a capacitor filter, an inductance filter, and a composite filter such as an LC filter and an RC filter. The output filter unit 1033 may further include a synchronous rectification and filtering circuit, which is not specifically limited in this embodiment.

In this embodiment, the first DC-to-DC conversion unit 103 further includes: a second power management unit 105 electrically connected to the first power management unit 201 and configured to perform Handshake communication with the first power management unit 201, and control the power output terminal 104 to output the second direct current to the first power management unit 201.

Specifically, the second power management unit 105 may be a power delivery management (PD) controller, or a fast-charging PD controller supporting the fast-charging source protocol. In this embodiment, the second power management unit 105 communicates bidirectionally with the first power management unit 201. The second power management unit 105 is electrically connected to the power factor correction controller and the QR controller, and communicates bidirectionally with the output filter unit 1033.

During the application process, after the second power management unit 105 communicates with the first power management unit 201, power of power supply supported by the external terminal connected to the first interface 202 is detected. The second power management unit 105 controls operation of the power factor correction controller, the QR controller, and the output filter unit 1033 according to the power of the power supply supported by the external terminal correspondingly, so as to convert the first direct current output by the rectification part 1021 into the second direct current that is suitable for charging the external terminal connected to the first interface 202, thereby avoiding excessive current from entering the external terminal connected to the first interface.

When the power output terminal 104 outputs the second direct current, when communicating with the first power management unit 201 and after performing Handshake communication with the external terminal connected to the first interface 202, the second power management unit 105 may realize fast power supply or fast charging of the external terminal and make the power supply stable and efficient. This embodiment does not specifically limit the second power management unit 105.

In this embodiment, the interface conversion module 2 further has: a plurality of second interfaces 203 and a plurality of conversion paths configured to perform interface switching between the plurality of second interfaces 203 and the first interface 202 respectively. When the first power management unit 201 outputs the second direct current to the first interface 202, the second direct current is provided to the plurality of conversion paths; and after the first power management unit 201 pulls the third direct current, the third direct current is provided to the plurality of conversion paths.

The interface conversion module 2 also includes: a second DC-to-DC conversion unit 204 electrically connected between the first power management unit 201 and the plurality of conversion paths and configured to convert the second direct current or the third direct current provided by the first power management unit 201 to the plurality of conversion paths into a fourth direct current.

Specifically, the second DC-to-DC conversion unit 204 may be a buck-boost controller (Buck-Boost IC), or other devices or circuits capable of realizing DC conversion, which is not specifically limited in this embodiment.

In this embodiment, the second interfaces 203 may include at least one USB A port and at least one USB C port, and the conversion paths are provided with a USB 2.0 interface conversion controller, a USB 3.1 interface conversion controller, and a data conversion controller.

Specifically, the second interfaces 203 include at least one USB C1 port and two USB A ports, for example, a USB C1 port, a USB A1 port, and a USB A2 port. All of the USB C1 port, the USB A1 port, the USB A2 port, the USB 2.0 interface conversion controller, the USB 3.1 interface conversion controller, and a data conversion controller are electrically connected to the second DC-to-DC conversion unit 204. The USB C1 port communicates bidirectionally with the data conversion controller. The data conversion controller communicates bidirectionally with the USB 2.0 interface conversion controller. Both the USB A1 port and the USB A2 port communicate bidirectionally with the USB 3.1 interface conversion controller. The USB 3.1 interface conversion controller communicates bidirectionally with the first interface 202, the data conversion controller, and the USB 2.0 interface conversion controller.

In this embodiment, all of the USB C1 port, the USB A1 port, and the USB A2 port can read and write data, and can be connected various external USB devices and supply power to the external USB devices. All of the USB C1 port, the USB A1 port, and the USB A2 port support a variety of charging protocols. Specific models and supported charging protocols of the USB C 1 port, the USB A1 port, and the USB A2 port can be set according to needs. The USB C 1 port, the USB A1 port, and the USB A2 port may also be interfaces without a charging protocol, which are not limited in this embodiment.

During the application process, the second DC-to-DC conversion unit 204 converts the second direct current or the third direct current into a fourth direct current. After the USB 2.0 interface conversion controller or the USB 3.1 interface conversion controller perform Handshake communication with the external USB device, the connected external USB devices is supplied power to through the USB C 1 port, the USB A1 port, or the USB A2 port. Through the USB 2.0 interface conversion controller or the USB 3.1 interface conversion controller, interface conversion between the USB C1 port, the USB A1 port, or the USB A2 port and other interfaces is realized.

In this embodiment, the second interfaces 203 further include at least one HDMI interface, and the conversion paths are provided with an HDMI interface for communicating bidirectionally with the HDMI interface.

Specifically, the HDMI interface can be an HDMI port as shown in FIG. 2. The HDMI interface is a High Definition Multimedia Interface (HDMI). The HDMI controller is electrically connected to the second DC-to-DC conversion unit 204. The HDMI controller communicates bidirectionally with both the first power management unit 201 and the first interface 202. In this embodiment, the HDMI interface can be connected to devices such as projectors, monitors, and televisions, supports output of multiple resolutions, and supports display modes such as a same screen and expansion. Relevant parameters of the HDMI interface can be set as required, which is not specifically limited in this embodiment.

During the application process, the fourth direct current converted by the second DC-to-DC conversion unit 204 supplies power to the HDMI interface and the HDMI controller, and the HDMI controller implements interface conversion between the HDMI interface and other interfaces.

In this embodiment, the second interfaces 203 further include at least one audio interface, and the conversion paths are provided with an audio interface controller for communicating bidirectionally with the audio interface.

Specifically, the audio interface controller is electrically connected to the second DC-to-DC conversion unit 204, and the audio interface controller communicates bidirectionally with the USB 2.0 interface conversion controller. In this embodiment, the audio interface can be a 3.5 millimeters (mm) audio interface as shown in FIG. 2. Additionally, the audio interface can also be a 2.5 millimeters (mm) audio interface, a 6.22 millimeters (mm) audio interface, etc. When using audio interfaces with different specification parameters, the audio interface can be externally connected to an audio plug with corresponding specification parameters, which supports mobile terminals, computer terminals, or audio devices. Relevant parameters of the audio interface can be set as required, which is not specifically limited in this embodiment.

During the application process, the fourth direct current converted by the second DC-to-DC conversion unit 204 supplies power to the audio interface and the audio interface controller, and the audio interface controller and the USB 2.0 interface conversion controller implement interface conversion between the audio interface and other interfaces.

In this embodiment, the second interfaces 203 further include at least one Ethernet interface, and the conversion paths are provided with an Ethernet controller for communicating bidirectionally with the Ethernet interface.

Specifically, the Ethernet interface is an RJ45 port as shown in FIG. 2. The RJ45 port is a network card interface for data transmission. In this embodiment, the Ethernet controller is electrically connected to the second DC-to-DC conversion unit 204, and the Ethernet controller communicates bidirectionally with the USB 3.1 interface conversion controller. In the application process, the Ethernet controller and the USB 3.1 interface conversion controller implement interface conversion between the Ethernet interface and other interfaces.

In this embodiment, the second interfaces 203 may also include any interface capable of supporting an interface conversion function, for example, a USB 2.0 interface, a USB 3.0 interface, a USB Type-A interface, a USB Type-B interface, a Secure Digital Card (SD) slot, a Trans-flash Card (TF) slot, and a Video Graphics Array (VGA) interface, etc. Available interface types are not specifically limited.

Figure 3:
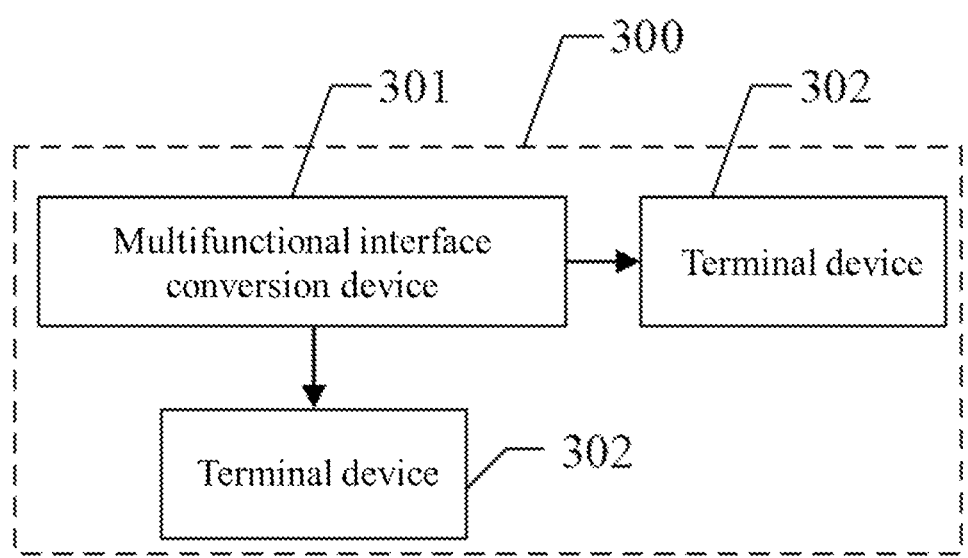
FIG. 3 is a schematic structural diagram of an embodiment of a multifunctional interface conversion system according to some embodiments of the present disclosure.

On the other hand, the present disclosure provides a multifunctional interface conversion system. As shown in FIG. 3, the multifunctional interface conversion system 300 includes a multifunctional interface conversion device 301 and a plurality of terminal devices 302. In some embodiments, the multifunctional interface conversion device 301 may be a multifunctional interface conversion device as shown in FIGS. 1-2. The multifunctional interface conversion device 301 and the plurality of terminal devices 302 perform data transmission or power transmission therebetween through a first interface (e.g., the first interface 202) and a second interface (e.g., the second interfaces 203) of the multifunctional interface conversion device 301. The terminal device 302 may be any electronic device supporting the data transmission or the power transmission, or any electronic device capable of power transmission.

A multifunctional interface conversion device and a multifunctional interface conversion system provided by embodiments of the present disclosure have been introduced above in detail. In this paper, specific embodiments are used to illustrate the principle and implementation of the present disclosure. The descriptions of the above embodiments are merely used to help understand the method of the present disclosure and its core idea. Meantime, for those skilled in the art, according to the idea of the present disclosure, there will be changes in the specific implementation and an application scope. In summary, the content of the specification should not be construed as a limitation of the present disclosure.

What is claimed is:

1. A multifunctional interface conversion device, comprising a power adapter module and an interface conversion module, wherein:

the power adapter module comprises: an alternating current-to-direct current conversion unit configured to convert an input alternating current into a first direct current; a first direct current-to-direct current conversion unit configured to convert the first direct current into a second direct current; and a power output terminal configured to output the second direct current;

the interface conversion module comprises: a first power management unit connected to the power output terminal and configured to output the second direct current to a first interface of the interface conversion module when the power output terminal outputs the second direct current, and to pull a third direct current from the first interface to supply power to the interface conversion module when the power output terminal stops outputting the second direct current.

2. The multifunctional interface conversion device of claim 1, wherein the interface conversion module further has a plurality of second interfaces and a plurality of conversion paths configured to perform interface switching between the plurality of second interfaces and the first interface respectively, wherein when the first power management unit outputs the second direct current to the first interface, the second direct current is provided to the plurality of conversion paths, and after the first power management unit pulls the third direct current, the third direct current is provided to the plurality of conversion paths.

3. The multifunctional interface conversion device of claim 2, wherein the interface conversion module further comprises: a second direct current-to-direct current conversion unit electrically connected between the first power management unit and the plurality of conversion paths and configured to convert the second direct current or the third direct current provided by the first power management unit to the plurality of conversion paths into a fourth direct current.

4. The multifunctional interface conversion device of claim 1, wherein the first direct current-to-direct current conversion unit comprises: a power factor correction part electrically connected to the alternating current-to-direct current conversion unit and configured to eliminate a ripple current in the first direct current.

5. The multifunctional interface conversion device of claim 4, wherein the first direct current-to-direct current conversion unit further comprises: a transformer part electrically connected to the power factor correction part and configured to convert the first direct current into the second direct current.

6. The multifunctional interface conversion device of claim 5, wherein the first direct current-to-direct current conversion unit further comprises: an output filter part electrically connected to the transformer part and configured to filter the second direct current.

7. The multifunctional interface conversion device of claim 6, wherein the first direct current-to-direct current conversion unit further comprises: a second power management unit electrically connected to the first power management unit and configured to perform Handshake communication with the first power management unit and control the power output terminal to output the second direct current to the first power management unit.

8. The multifunctional interface conversion device of claim 6, wherein the alternating current-to-direct current conversion unit comprises: an input filter part configured to filter the input alternating current power.

9. The multifunctional interface conversion device of claim 8, wherein the alternating current-to-direct current conversion unit further comprises: a rectification part electrically connected to the input filter part and configured to perform rectification on the input alternating current to obtain the first direct current.

10. A multifunctional interface conversion system comprising a multifunctional interface conversion device, wherein the multifunctional interface conversion device comprises a power adapter module and an interface conversion module, wherein:
the power adapter module comprises: an alternating current-to-direct current conversion unit configured to convert an input alternating current into a first direct current;
a first direct current-to-direct current conversion unit configured to convert the first direct current into a second direct current; and a power output terminal configured to output the second direct current;
the interface conversion module comprises: a first power management unit connected to the power output terminal, configured to output the second direct current to a first interface of the interface conversion module when the power output terminal outputs the second direct current, and to pull a third direct current from the first interface to supply power to the interface conversion module when the power output terminal stops outputting the second direct current.

11. The multifunctional interface conversion system of claim 10, wherein the interface conversion module further has a plurality of second interfaces and a plurality of conversion paths configured to perform interface switching between the plurality of second interfaces and the first interface respectively, wherein when the first power management unit outputs the second direct current to the first interface, the second direct current is provided to the plurality of conversion paths, and after the first power management unit pulls the third direct current, the third direct current is provided to the plurality of conversion paths.

12. The multifunctional interface conversion system of claim 11, wherein the interface conversion module further comprises: a second direct current-to-direct current conversion unit electrically connected between the first power management unit and the plurality of conversion paths and configured to convert the second direct current or the third direct current provided by the first power management unit to the plurality of conversion paths into a fourth direct current.

13. The multifunctional interface conversion system of claim 10, wherein the first direct current-to-direct current conversion unit comprises: a power factor correction part electrically connected to the alternating current-to-direct current conversion unit and configured to eliminate a ripple current in the first direct current.

14. The multifunctional interface conversion system of claim 13, wherein the first direct current-to-direct current conversion unit further comprises: a transformer part electrically connected to the power factor correction part and configured to convert the first direct current into the second direct current.

15. The multifunctional interface conversion system of claim 14, wherein the first direct current-to-direct current conversion unit further comprises: an output filter part electrically connected to the transformer part and configured to filter the second direct current.

16. The multifunctional interface conversion system of claim 15, wherein the first direct current-to-direct current conversion unit further comprises: a second power management unit electrically connected to the first power management unit and configured to perform Handshake communication with the first power management unit and control the power output terminal to output the second direct current to the first power management unit.

17. The multifunctional interface conversion system of claim 15, wherein the alternating current-to-direct current conversion unit comprises: an input filter part configured to filter the input alternating current power.

18. The multifunctional interface conversion system of claim 17, wherein the alternating current-to-direct current conversion unit further comprises: a rectification part electrically connected to the input filter part and configured to perform rectification on the input alternating current to obtain the first direct current.

* * * * *